(12) United States Patent
Frager et al.

(10) Patent No.: US 11,605,120 B2
(45) Date of Patent: Mar. 14, 2023

(54) SYSTEMS AND METHODS FOR GLOBAL DYNAMIC HIERARCHICAL ORDERING SYSTEM

(71) Applicant: ORDER HOPPER, INC, Pikesville, MD (US)

(72) Inventors: Ezra Frager, Baltimore, MD (US); Jonathan Pomper, Miami Beach, FL (US); Brian Silberberg, Pikesville, MD (US)

(73) Assignee: ORDER HOPPER, INC, Pikesville, MD (US)

( * ) Notice: Subject to any disclaimer, the term of this patent is extended or adjusted under 35 U.S.C. 154(b) by 351 days.

(21) Appl. No.: 15/204,880

(22) Filed: Jul. 7, 2016

(65) Prior Publication Data
US 2017/0011450 A1    Jan. 12, 2017

Related U.S. Application Data

(60) Provisional application No. 62/189,362, filed on Jul. 7, 2015.

(51) Int. Cl.
| | | |
|---|---|---|
| G06Q 30/00 | (2012.01) |
| G06Q 20/00 | (2012.01) |
| G06Q 50/00 | (2012.01) |
| G06Q 30/0601 | (2023.01) |
| G06Q 30/0204 | (2023.01) |
| G06Q 30/0251 | (2023.01) |
| G06Q 20/34 | (2012.01) |
| G06Q 20/40 | (2012.01) |
| G06Q 20/24 | (2012.01) |
| G06Q 20/12 | (2012.01) |
| H04M 3/51 | (2006.01) |
| H04M 7/00 | (2006.01) |

(52) U.S. Cl.
CPC ........ *G06Q 30/0635* (2013.01); *G06Q 20/12* (2013.01); *G06Q 20/24* (2013.01); *G06Q 20/351* (2013.01); *G06Q 20/405* (2013.01); *G06Q 30/0204* (2013.01); *G06Q 30/0255* (2013.01); *G06Q 30/0261* (2013.01); *G06Q 30/0621* (2013.01); *G06Q 50/01* (2013.01); *H04M 3/5191* (2013.01); *H04M 7/006* (2013.01); *H04M 2203/1058* (2013.01)

(58) Field of Classification Search
None
See application file for complete search history.

(56) References Cited

U.S. PATENT DOCUMENTS

| | | | | |
|---|---|---|---|---|
| 8,863,156 B1* | 10/2014 | Lepanto | .............. | G06F 9/44521 719/328 |
| 9,823,909 B1* | 11/2017 | Kuo | .......................... | G06F 8/52 |
| 2002/0123957 A1* | 9/2002 | Notarius | ................. | G06Q 30/06 705/37 |
| 2003/0158795 A1* | 8/2003 | Markham | .............. | B23Q 35/12 705/28 |

(Continued)

*Primary Examiner* — Hafiz A Kassim
*Assistant Examiner* — Matheus Ribeiro Stivaletti
(74) *Attorney, Agent, or Firm* — Michael L. Greenberg, Esq.; Greenberg & Lieberman, LLC

(57) ABSTRACT

A unified ecommerce platform system that enables sellers to acquire in depth insight into their business market and consumers utilizing a centralized cloud based platform with enhanced consumer purchasing and information gathering abilities and allows users enhanced granular security tools and information for purchase.

1 Claim, 4 Drawing Sheets

(56) References Cited

U.S. PATENT DOCUMENTS

| | | | |
|---|---|---|---|
| 2005/0021688 A1* | 1/2005 | Felts | H04L 41/22 709/220 |
| 2005/0149712 A1* | 7/2005 | Martinez | G06F 9/44505 713/1 |
| 2006/0010162 A1* | 1/2006 | Stevens | G06F 16/78 |
| 2006/0064675 A1* | 3/2006 | Novik | G06F 9/4488 717/116 |
| 2008/0307085 A1* | 12/2008 | Curran | H04L 61/3025 709/223 |
| 2010/0030734 A1* | 2/2010 | Chunilal | G06Q 10/10 707/770 |
| 2010/0153515 A1* | 6/2010 | Lau | G06F 16/958 709/217 |
| 2011/0087966 A1* | 4/2011 | Leviathan | G06F 16/9577 715/745 |
| 2012/0109772 A1* | 5/2012 | Chernenko | G06Q 30/0611 705/26.3 |
| 2012/0224057 A1* | 9/2012 | Gill | H04L 63/102 348/143 |
| 2013/0173320 A1* | 7/2013 | Bank | G06Q 10/0639 705/7.11 |
| 2014/0075283 A1* | 3/2014 | Coursol | G06F 16/958 715/234 |
| 2014/0379507 A1* | 12/2014 | Pitt | G06Q 30/0601 705/26.1 |
| 2015/0007022 A1* | 1/2015 | Chen | G06F 3/0482 715/235 |
| 2015/0019365 A1* | 1/2015 | Vieira | G06Q 30/0611 705/26.3 |
| 2015/0058831 A1* | 2/2015 | Warren | G06F 8/41 717/140 |
| 2016/0012465 A1* | 1/2016 | Sharp | G06Q 20/18 705/14.17 |
| 2016/0134616 A1* | 5/2016 | Koushik | H04L 63/08 726/9 |
| 2018/0137521 A1* | 5/2018 | Norby | G06Q 30/0201 |

* cited by examiner

SYSTEMS AND METHODS FOR GLOBAL DYNAMIC HIERARCHICAL ORDERING SYSTEM

BACKGROUND

This application is a non-provisional of and claims benefit to U.S. Provisional Patent Application Ser. No. 62/189,362 filed Jul. 7, 2015 the disclosure of which is incorporated herein be reference in its entirety.

Various industry-specific systems/websites/software programs exist. Meanwhile, banking or financial tracking tools also are available. However, the industry-specific systems/websites/software programs and banking/financial tracking tools often operate independently. Users often access multiple systems/websites/software programs to order across industries, e.g., for products, services, food, events, tickets, etc. A desire exists for these products and services to be provided and consumed as part of a unified system.

The foregoing general description and the following detailed description are exemplary and explanatory only and are not restrictive of the disclosure.

SUMMARY OF THE INVENTION

In one embodiment, the invention is a system to create unified base templates of tables for use in cross linking of items for use in auto building out a store's menu of products or services, said system including:

a program stored on a computer readable medium including an input mechanism, an output mechanism and transmission configuration, by at least one of Internet, SMS or MMS wireless, or combinations thereof; said input including at least one user selectable unified base template configured for cross linking of items for use in auto building out a store's menu of products or services, including at least one of items, item types, options, option types, categories, keywords, industries, genres, themes, datasets and combinations thereof.

In one embodiment, the invention includes a one click automated building out of at least one of stores settings, profile-configuration in tables, item types, options, option types, categories, and datasets combinations thereof.

In one embodiment, the invention includes a configuration where by a seller modifies their individual settings of at least one of, pricing, naming, while still utilizing centralized core linkage of said system.

In one embodiment, the invention includes an output compilation of analytics formed by cross referencing businesses and or users including but not limited to, at least one of similar markets, regions, locations, products, industry, orders, order history, promotions, advertisements, coupons, sales, sales history, genre, user base, datasets or combinations thereof.

In one embodiment, the invention includes an output being a cheat sheet on consumers that stores utilize to offer products to said consumers based on purchases from other stores, similar products said consumer friends have purchased, or other customers who have similar preferences the store has, not just within the current store, but all stores across the platform.

In one embodiment, the invention includes communication to a consumer, said communication including but not limited to, advertisements, offers, or a combination of both, based on user preferences, order history, location data, item preferences, datasets or combinations thereof.

In one embodiment, the invention includes consumer purchase of an item followed by said item being delivered directly to said consumer based on the consumer location determined by at least one of gps, RFID tagged location, address, qr code linked to a location, or sensors triangulating the users location.

In one embodiment, the invention is a system that creates an unified template of tables for use in cross linking of items for use in auto building out a stores menu of products or services, including but not limited to such tables as , items, item types, options, option types, categories, keywords, and industries.

a. Such template tables are used in a one click automated building out of a stores settings/profile/configuration in tables, things, default items, item types, options, option types, categories.

b. Said system allows stores to modify their individual settings, pricing, naming etc, while still utilizing the centralized core linkage.

c. Said system will allow analytics to be created cross referencing businesses including but not limited to, by similar markets, regions, locations, products, industry, genre, user base.

d. Said system would create a cheat sheet on consumers that stores could utilize to offer products the consumer will want based on the consumer's purchases from other stores, similar products the consumer's friends have purchased, reviewed, or other customers who have similar preferences, not just within the current store, but all stores across the platform. Most POS systems only focus on data from within that store, they haven't had access to other stores' metadata or anonymized data.

e. Said system could send ad's to the consumers based on but not limited to user preferences, order history, location data, item preferences, etc.

f. Said system allows businesses to send a promotion to a user based on location.

g. Allow customers to schedule or auto order products/items as they become available, or auto purchase every Monday the same thing, for example dinner, or office supplies.

h. Said system can enable a consumer to require 2 factor authentication when ordering or accessing the platform.

i. Said system can enable store's to restrict access to employees including but not limited to, location, device, and/or time.

j. Said system enables stores to restrict store employees access including but not limited to, location, device, and/or time.

k. Said system enables consumers to create rules that control ordering and/or access to the system including but not limited to, specific locations , devices, and/or times.

l. Said system can enable a consumer to require a pin to be texted to verify order before placed or accessing the system.

m. Said system can enable consumers to restrict access to their account by location or device.

In one embodiment, the invention includes a system that allows a user to sign up with one account and use it on any store/business/transaction within the system, or other sites utilizing this system.

a. Such said system will allow the user to link their credit card to their account.

b. Such said system will allow the user to create virtual cards and link other users to said virtual card.

c. Such said virtual card will or will not have and not limited to such features as restrictions, thresholds, keywords, time limits, location limits, and or price.

In one embodiment, the invention includes an item gateway that will be an application programming interface (API) and or an external site that has the following features a. A database of items, products, services, or things including but not limited to attributes like upc code, unique codes, categories, product types, alcoholic items etc.

b. A system that would allow a user to register a credit card.

i. Allow said user to create thresholds/restrictions/limits/or other tags.

ii. Allow the card to have virtual cards.

iii. Allow the virtual card to be sub assigned.

iv. Allow the card or virtual card to require pre approval.

v. Allow a 2 factor authentication before the transaction completes.

c. a method that would allow a business to use their own website and query the item gateway to verify if all of the items in the cart are allowed to be purchased by the user's credit card.

d. allow a user to swipe a card in a store or process a transaction online without needing to create an account on that system to utilize the features already set in the item gateway, before the payment processes.

In one embodiment, the invention includes a method to allow digital display menus to link directly to the stores product line to allow for dynamic updating for items from 1 system.

In one embodiment, the invention includes a system would allow a user to buy a product in a location, and have the item delivered directly to the user based on the user's location. Such location will be but not limited to, GPS, RFID tagged location, address, qr code linked to a location, or sensors triangulating the user's location.

a. Said sensor can be enduser devices.

b. Said sensor can be wireless networks/hotspots.

c. Said sensor can be third party vendor devices.

In one embodiment, the invention includes a system that would allow a user to set customized preferences on products or items that would auto search and or customize the item when ordering from businesses on the system that have that product.

In one embodiment, the invention includes a method to allow a user to reorder one or more items from within a fully customized order of one or more products.

a. Ability to send/suggest another user a customized item and/or group of items.

i. Said suggestion can be a request by a user for another user to buy it for them.

In one embodiment, the invention includes a method that allows an order to be paid for by 1 or more people and delivered to one location.

In one embodiment, the invention includes a method to allow for a group to add items to an order based on a link, code, or other identifiable means.

a. Allow order organizer to pay for all, part, or none of the items added to said order.

b. Allow each user participating in a group order to pay for part, all or none of the order.

c. Adding to order can be restricted to but not limited to specific people, location, stores, price, time, categories etc..

10. Payment system with ability to create groups and or sub groups with restrictions on what can or can't be purchased, as granular as possible to the item/option/keyword/price/category level.

A. Said system can have thresholds requiring pre approval if order or item totals a specific amount or number of items.

In one embodiment, the invention includes asystem that would allow Vendors, Business Service oriented companies, Business to consumer companies, Service to consumer companies, and consumers to all be within the same platform.

a. This system would allow for unprecedented streamlined processes.

b. Allow for an automated workflow system to be utilized.

c. Allow for companies to increase business due to new marketplace of customers.

Said system will include but not limited to an inventory management system linked to an order processing system to automatically reduce inventory or produced products counts based on workflow of order.

a. Said inventory system will include but not limited to RFID tagging of products that will auto add/subtract items as they are added to shelves/racks/storage locations.

In one embodiment, the invention includes a system that can enable to stores to auto purchase more inventory as inventory reaches predefined thresholds based on store settings.

A system for creating and storing of recipes or product parts list to allow for the following.

a. Ingredients list being created.

b. Calories count and other allergy related tagging of products c. Inventory control mechanism to reduce the items or ingredients, or options of an item upon ordering by a user.

In one embodiment, the invention includes a system will also act as their centralized marketing platform with 1 or more of the following features, defined by the business.

a. Automated or manual Email marketing campaigns.

b. Automated or manual Facebook marketing campaigns.

c. Automated or manual twitter marketing campaigns.

d. Automated or manual Ad marketing campaigns.

In one embodiment, the invention includes a system is a centralized system for ordering, marketing, inventory, staffing, workflow/process management, customer management, and analytical intelligence reports, which is only possible in a unified platform as previously described. In one embodiment, the invention includes an automated VOIP installation process, where a business can click enable VOIP services, and said system will generate a phone number and allow customers to call said number to place orders, or get order update status.

a. Said VOIP system will also enable text to order, allowing customers to text in orders.

b. Said system will allow for texting of images to place orders.

In one embodiment, the invention is a system for creating a unified platform utilizing a schema of templates of tables for use in cross linking of items for use in auto building out a stores menu of products or services, said system comprising at least one of:

items, item types, options, option types, categories, keywords, industries, genres, themes, datasets and combinations thereof; said system further comprising:

a. a one click automated building out of a stores settings/profile/configuration in tables, things, default items, item types, options, option types, categories, data sets;

b. a modification configuration providing said system allowing stores to modify their individual settings, pricing, naming, while still utilizing the centralized core schema;

c. an analytics creation output formed by cross referencing businesses by at least one of the following; similar markets, regions, locations, products, industry, genre, user base, order history, ad history, employee transaction, employee data, or marketing history;
d. a cheat sheet output on consumers that stores could utilize to offer products to a targeted consumer that they will want based on at least one of said consumer's purchases from other stores, similar products the consumer's friends have purchased, reviewed, or other customers who have similar preferences, not just within the current store, but all stores across said system platform;
e. optionally, a communications device configured to send ad's to a consumer based on at least one of user preferences, order history, friends, location data, item preferences, or combinations thereof;
f. optionally, a communications device configured to send ad's to consumers based on user based location;
g. a consumer order portal configured to schedule or auto order products or items as they become available, or auto purchase at a set time interval;
h. a two factor authentication system consumers can utilize when ordering or accessing the platform;
i. a restricted access configuration for employees including at least one of access restriction base one location, device, or time;
j. a consumer rule creation configuration that controls ordering or access to the system based on at least one of specific locations , devices, setting, rule, or time;.
k. allowing digital display menus to link directly to the stores product line to allow for dynamic updating for items from a single system;
l. providing a consumer a configuration to reorder one or more items from within a fully customized order of one or more products;
m. transmitting information to suggest another consumer a customized item or group of items, whereby said suggestion is a request by said user for said another consumer to buy it for said consumer;
n. providing a payment system configured to allow an order to be paid for by one or more people and delivered to one location;
o. a program stored on a computer readable medium including an input mechanism, an output mechanism and transmission configuration, by at least one of Internet, SMS or MMS wireless, or combinations thereof; incorporated into said system.

In one embodiment, the invention is further comprising a configuration that allows said consumer to sign up with one account and use it on any store, business transaction within the system, or other sites utilizing this system, whereby:
a. a configuration allowing said consumer to link a credit card to their system account;
b. a configuration allowing said consumer to create virtual cards and link other users to said virtual card, whereby said virtual card is configurable with restrictions, pre approval requirement, sequential levels of pre approval process, thresholds, keywords, time limits, location limits, price, or combinations thereof.

In one embodiment, the invention is an item gateway system configured as an application programming interface (API) or an external site comprising:
a. a database of items, products, services, or things including at least one of upc code, unique codes, categories, product types, alcoholic items; and
b. a registration system configured to a consumer to register a credit card, said registration system comprising:
i. a user created threshold setting for restrictions, limits, or other tags;
ii. optionally, a virtual card creation system, whereby said virtual card is able to be sub assigned;
iv. a pre-approval system that requires pre approval of said credit card or said virtual card; and
v. optionally, a two factor authentication required before any transaction completes.

In one embodiment, the invention is configured to allow said consumer to buy a product in a location, and have said product delivered directly to said consumer based on said consumer location determined by at least one of: GPS, RFID tagged location, address, QR code linked to a location, or sensors triangulating the user's location, whereby said sensors are at least one of an end user device, a wireless network or hotspot, or a third party vendor devices.

In one embodiment, the invention is configured to allow said consumer to set customized preferences on products or items that would auto search and or customize the item when ordering from businesses on the system that have that product.

In one embodiment, the invention is configured for access in use to each of vendors, business service oriented companies, business to consumer companies, service to consumer companies, and consumers to all be within the same platform, whereby said system is configured with a streamlined process, allows for an automated workflow system to be utilized, and allows for companies to increase business due to new marketplace of customers.

In one embodiment, the invention is configured for an inventory management system linked to an order processing system to automatically reduce inventory or produced products counts based on workflow of order, whereby said inventory system includes at least one of RFID tagging of products that will auto add or subtract items as they are added to shelves , racks, or storage locations.

In one embodiment, the invention is configured to enable to stores to auto purchase inventory as inventory reaches predefined thresholds based on store settings.

In one embodiment, the invention is configured for creating and storing of recipes or product parts list to allow for at least one of the following:
a. Ingredients list being created;
b. Calories count and other allergy related tagging of products;
c. Inventory control mechanism to reduce the items or ingredients, or options of an item upon ordering by a user.

In one embodiment, the invention is configured for a centralized marketing platform with at least one of the following features, defined by the business:
a. Automated or manual Email marketing campaigns;
b. Automated or manual Facebook marketing campaigns;
c. Automated or manual twitter marketing campaigns;
d. Automated or manual Ad marketing campaigns; or combinations thereof.

In one embodiment, the invention is configured with a centralized system for ordering, marketing, inventory, staffing, workflow/process management, customer management, and analytical intelligence reports, utilizing only a unified platform.

In one embodiment, the invention is configured with an automated VOIP installation process, where a business click enable VOIP services, and said system will generate a phone number and allow customers to call said number to place orders, or get order update status, said VOIP including:

a. text to order, allowing customers to text in orders;
b. texting of images to place orders; or combinations thereof.

In one embodiment, the invention is a method for providing a business to use their own website and query the item gateway to verify if all of the items in the cart are allowed to be purchased by the user's credit card, said method comprising the steps of:
a. providing system of claim 3;
b. allowing a consumer to swipe a card in a store or process a transaction online without needing to create an account within that stores system to utilize the features already set in the item gateway, before the payment processes;

In one embodiment, the invention is a method further comprising the steps of:
a. Allowing an order organizer to pay for all, part, or none of the items added to said order;
b. Allowing each user participating in a group order to pay for part, all or none of the order;
c. Adding to said order can a restriction to specific people, location, stores, price, time, categories , or combinations thereof; and
d. providing a payment system configured to create groups and or sub groups with restrictions on purchases based on at least one of, item, option. keyword, price, category level or combinations thereof; whereby said payment system is configured with thresholds requiring pre approval if order or item totals a specific amount or number of items.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF THE PREFERRED EMBODIMENTS

Figure 1:
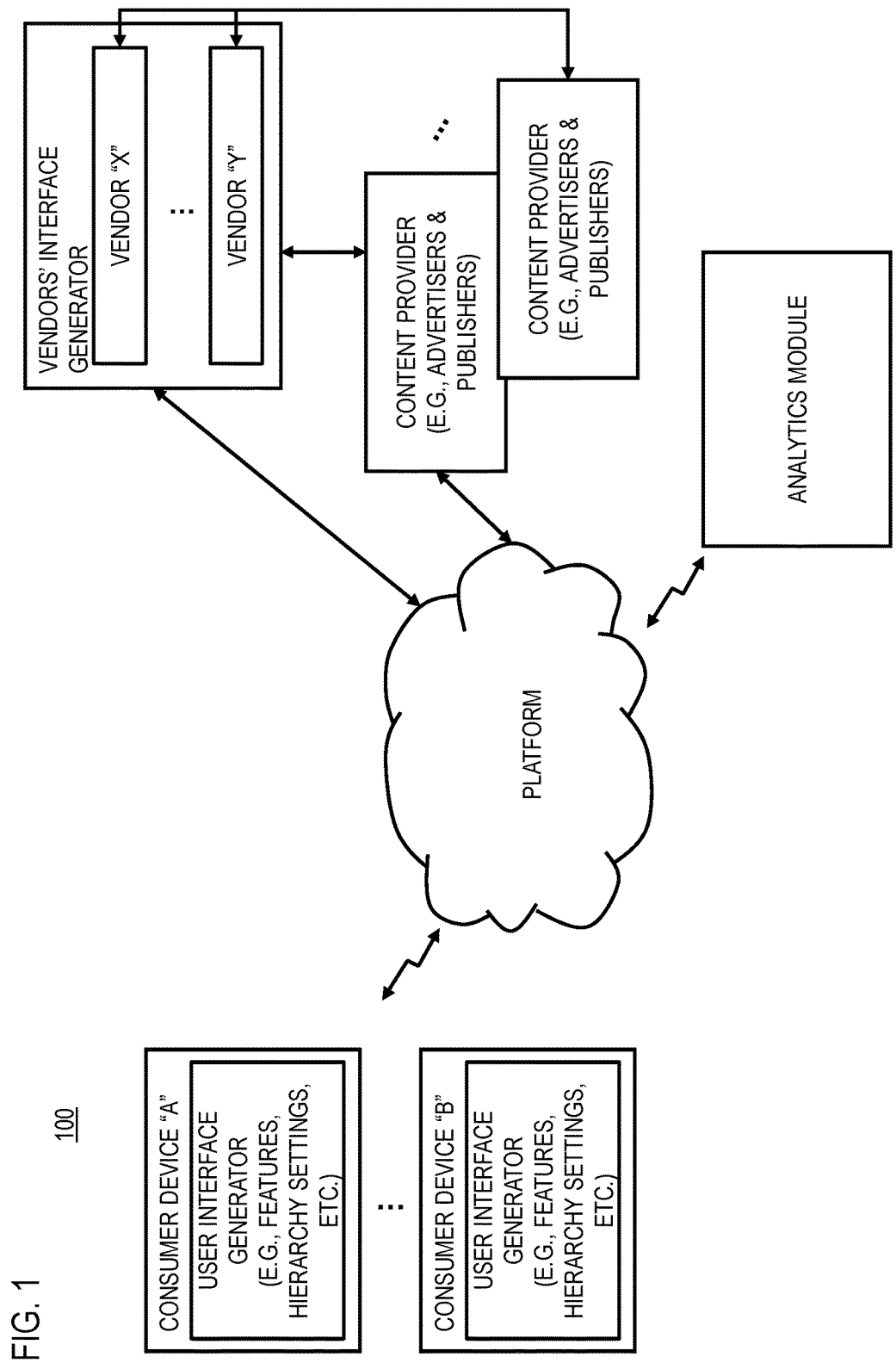
FIG. 1 is a block diagram of an exemplary system and network for the global dynamic hierarchical ordering system, according to one embodiment of the present invention.
Figure 2A:
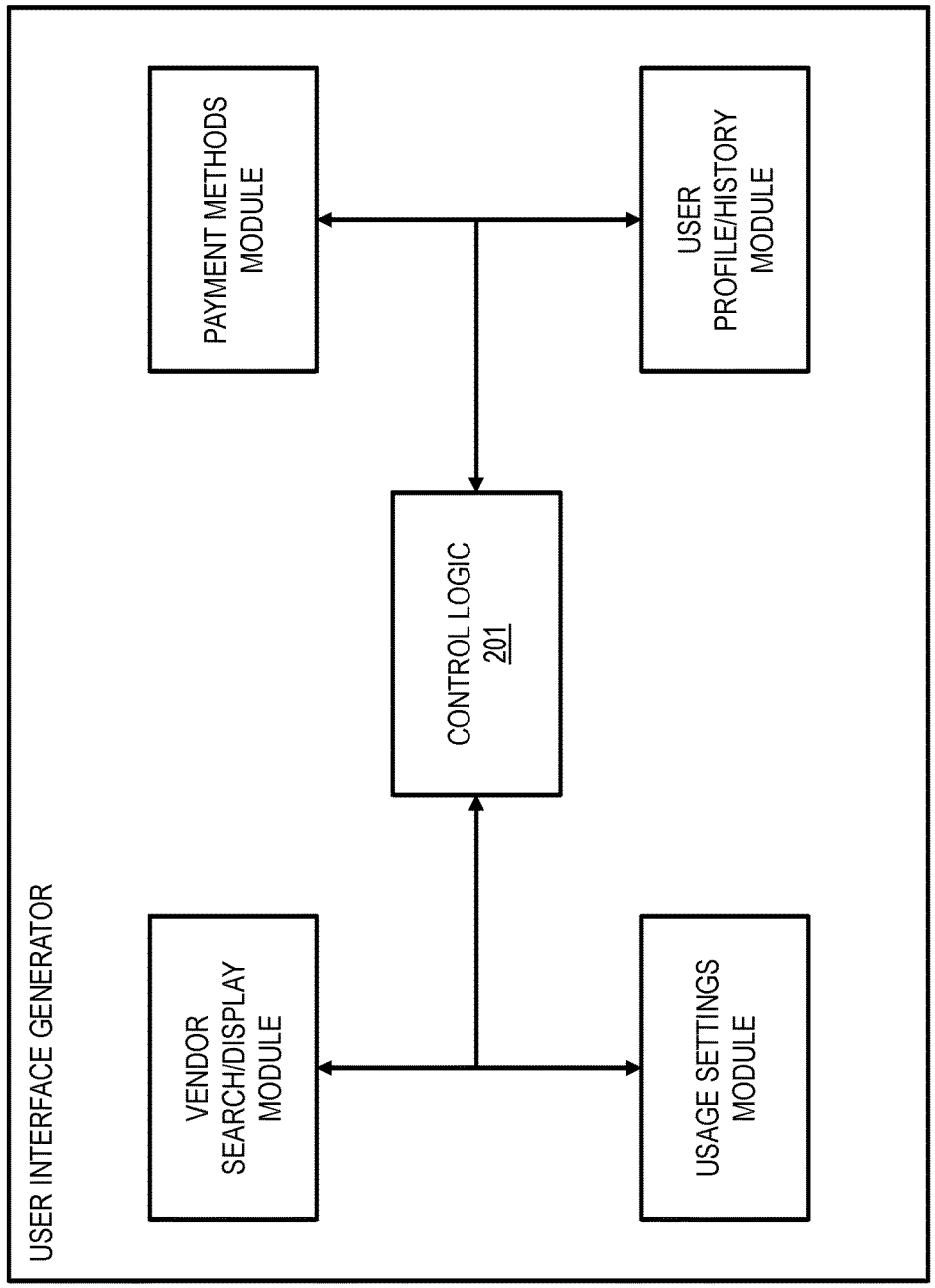
FIG. 2A is a block diagram of a user interface generator, according to one embodiment of the present invention.
Figure 2B:
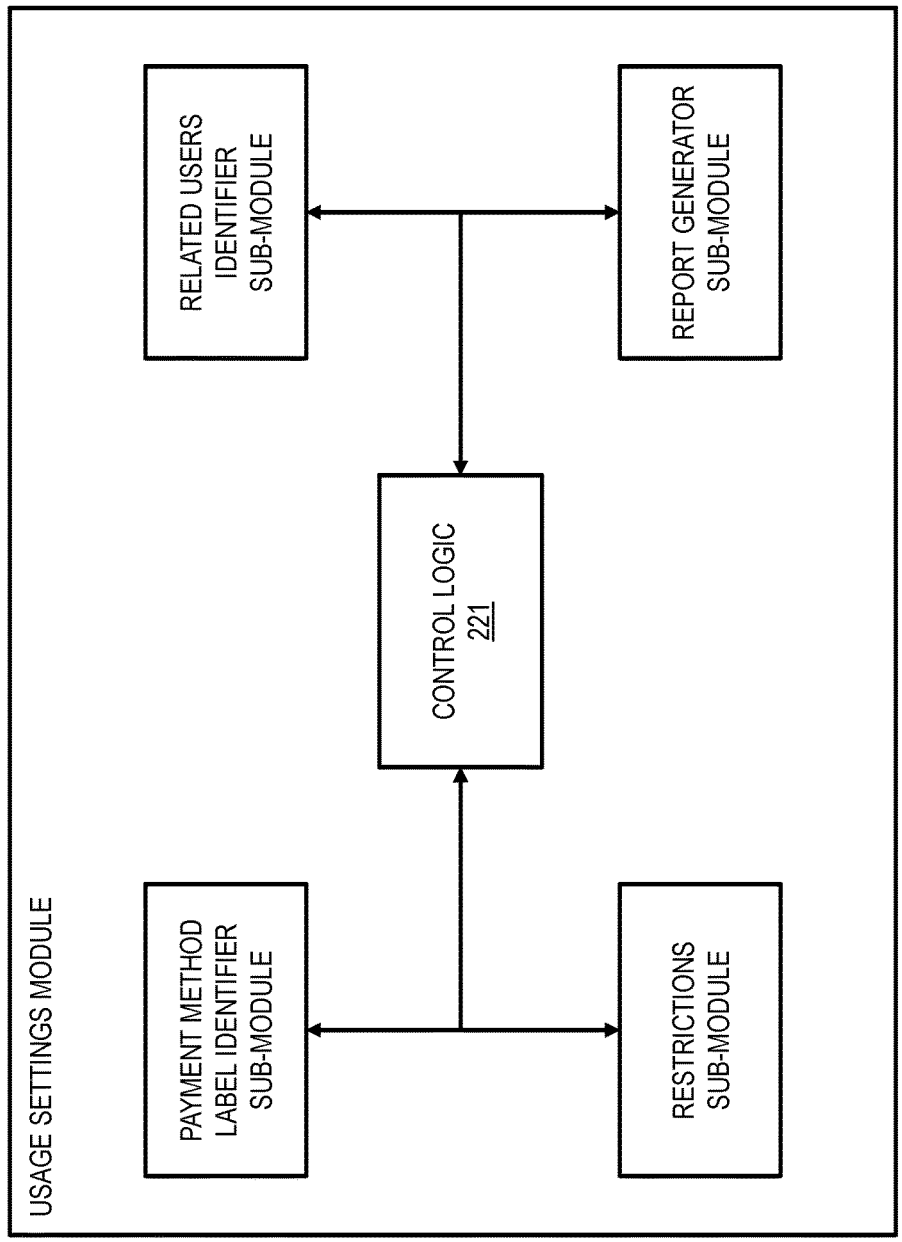
FIG. 2B is a block diagram of a usage settings module of an embodiment of a user interface generator, according to one embodiment of the present invention.
Figure 3A:
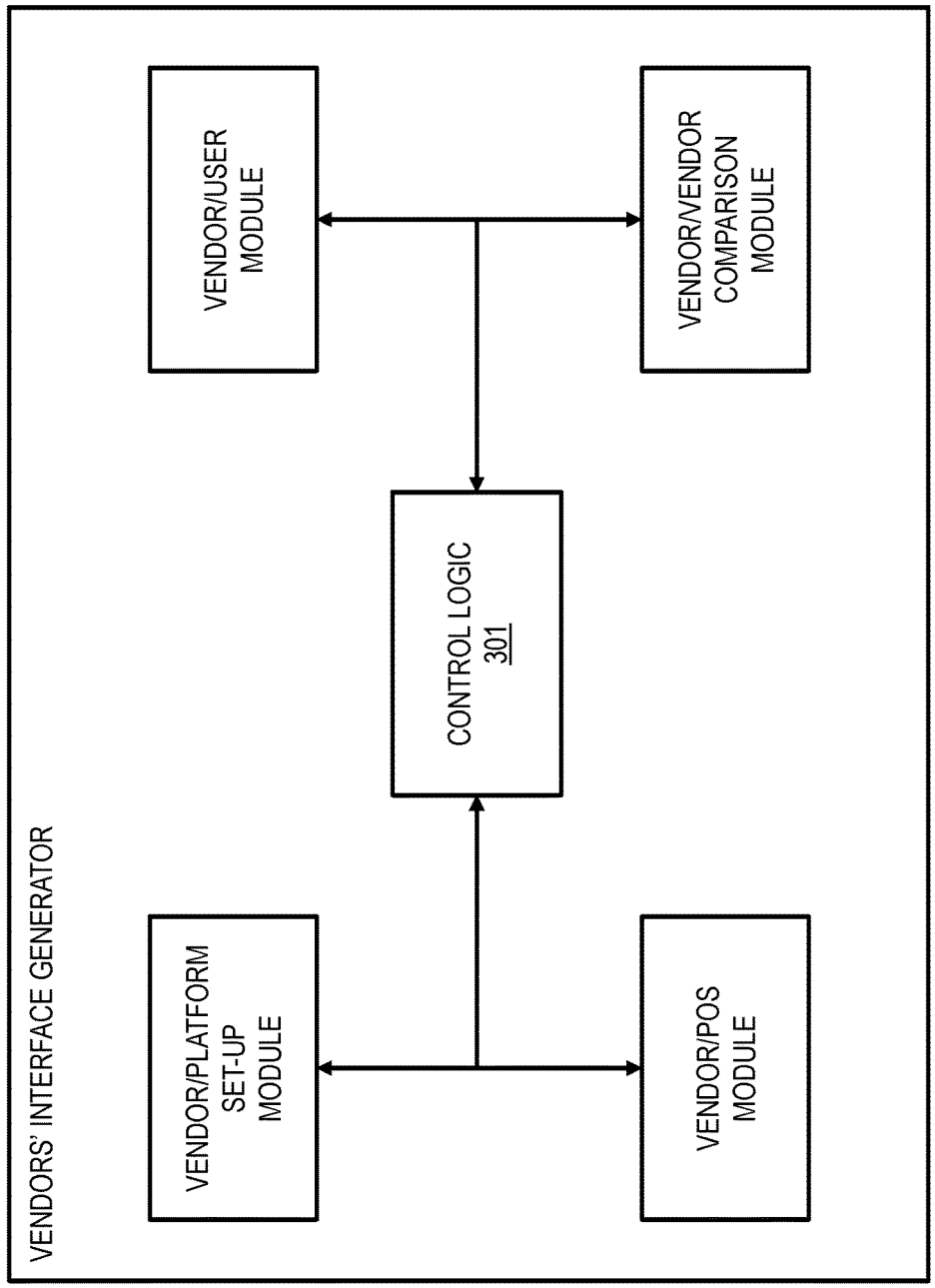
FIG. 3A is a block diagram of a vendors' interface generator, according to one embodiment of the present invention.

Reference will now be made in detail to the embodiments of the disclosure, examples of which are illustrated in the accompanying drawings. Wherever possible, the same reference numbers will be used throughout the drawings to refer to the same or like parts.

The system, in one embodiment, includes a platform that hosts vendors that provide products, services, and/or things for any industry or category. In addition, the products and/or services will be predefined and/or cross-referenced between stores, users, orders, a unified platform (as explained in further detail below), etc.

The present invention disclosure includes systems and methods for a global dynamic hierarchical ordering system. In one embodiment, the disclosure includes a platform where vendors, across industries, will establish their customer interface in a uniform manner, as provided by the platform. The platform, in one embodiment, integrates various features in a marketplace to enable fully dynamic usage and provide support for any industry. In addition, the platform permits a user or vendor to buy/search from several different vendors to compare pricing on identical/similar products, either by name, keyword, item type, rating, etc. A user utilizes such a search in deciding on a purchase, and a vendor will use such a search in pricing, marketing, or in making inventory decisions. In addition to providing a range of vendors for users to interact with, the platform provides users with the ability to monitor, track, and control interactions through the platform, depending on the users' status or identity with respect to other users in the system. Both vendors and users/consumers will access the system to facilitate operations, and to obtain analytics to help them better understand financial transactional behavior, consumer preferences, and demographics.

One embodiment of the system provides approval functions within the system. For example, the system will provide functionalities to users identified as management personnel, meaning, the system provides a supervisor or manager with the option to grant an employee approval for a financial transaction using the system. One scenario involving an approval system includes an employee who wishes to perform a monetary transaction. Currently, approval procedures involve an employee filling out forms, obtaining approval signatures on the forms, and/or giving the forms to a purchasing department that will place and order and/or provide a refund based on the employee's forms. The approval process includes several steps and approval from several different people or entities. The present disclosure includes a system that will facilitate the process for tracking approvals, processing orders, and providing payments. Similarly, a parent user will track, approve, and budget a child user's spending on consumer interactions made through the platform.

In one embodiment, the present system includes a method of creating and storing items that permits financial interactions across industries, as well as hierarchical controls on various financial interaction types, based on the relationships between users. In one embodiment, the disclosure includes a centralized collection of all types of "things." For example, a vendor (e.g., a business or store) selects through the system. Upon set-up, the system will include a prompt for the vendor to build a profile of the business or store, e.g., based on the industry, theme, or other defining characteristics of the business or store. In one scenario, the system is configured to generate a profile for the vendor based on their industry, including, for instance, a premade menu and/or inventory of services that will be created for that store. The menu is created based on the industry, theme, and/or genre of business. The business/store profile will further include options for editing names, adding options, setting pricing, editing settings/characteristics, and/or adding products that will not be predefined. The premade menu or prompts will permit a vendor to set up a profile or access point on the system easily. In an exemplary case, the system will further provide a template of selections for the "storefront." For example, the storefront will include an interface that will compare stores, products, or services. In a further embodiment, the system will provide analytics on the comparisons using collective user transactional information. Such insights will be provided to various users and/or business vendors.

In one embodiment, the insights will involve pricing information for a vendor. For example, the system will determine that a slice of pizza in a specific neighborhood is, on average, 25 cents cheaper than pizza sold by Vendor "A", and sells 30% more than Vendor A's. With this information, Vendor A will determine to lower the price of its pizza. Another example will include the system determining that Vendor A's pizza is 50 cents cheaper than a local market rate for pizza, but that Vendor A's pizza sells 30% more than others in the neighborhood. Vendor A will wish to adjust its pricing, or at least have insight into its sales. Alternately or in addition, the system will provide information on trending products (that a vendor will or will not be selling). For example, the system will determine that Vendor A, a pizzeria, is one of the few pizzerias in the neighborhood not selling sushi. For the pizzerias that sell sushi, sushi will make up 22% of their sales. Such information will permit Vendor A to consider selling sushi.

Unified Centralized Database

In one embodiment, the system exists due to the unified database configuration. The database is configured in a way that lets the system define the standardized layer of data. In the past, typical POS systems have been configured for one specific market, one specific industry. This system is fully dynamic, an industry can be added into the database at any given time. By utilizing a centralized database, it allows for accessing numerous linked data sets that cannot be linked without those data sets existing in a unified platform, providing the greatest level of granularity never before thought possible. It lets users utilize a single account, and have their preferences applied to any store, lets their credit card info be used with any store. Let's users find similarities or other products they will like based on purchase patterns or things friends like in common. These concepts have never been capable on such a large scale, dynamic system. Companies like Amazon, have analytical powers on trending items, but only work at the item level, not a business level. Amazon also doesn't let stores promote their stores as a whole, only individual items.

The database will have tables broken down into at least 3 types of tables, Core, Stores, Users.

The core tables will have but not limited to such tables like industry, genre, category, items, item types, options, option types, keywords etc. One example of how these tables work, is that they will build off one another allowing you to create a layered approach, while still being able to keep datasets minimized.

Examples of industries might be, but not limited to, clothing, office supplies, hardware, bar, babysitting, dry cleaning, food, and restaurants.

The following examples would be genres of a restaurant might be but not limited to, Chinese style, American, BBQ, Italian, etc. Stores would have the ability to select as many genres as they want. This would populate the items and options relevant to those genres. The store would the customize the price, names, and remove any thing they don't offer. Genres would be linked to Industries via a genre to industry table, allowing genres to be referenced by more than one industry.

Some examples, of an option type but not limited to, would be size, vegetables, fruits, bread, processor, flavor, frequency, or color. An example of option types would be all of the colors. There would be a third table called options types to options allowing you to connect the actual colors to the option called color. There will be another option might be shirt color. The system would then have a new set of options linked to the same respective colors from the option tables, reducing large amounts of unnecessary data.

Examples of items and item types in the core system are very similar, the item type might be hamburger, but the item might be a pastrami burger, or hamburger, or cheese burger. The items would have different options and option types relevant to the respective items. For example, a item called pastrami burger, would have the item type of hamburger with an option type called meat and all different mean options possible, with pastrami selected by default.

The core item type of hamburger might have the following option types linked to it, but the defaults selected would differ based on the actual item. Option types will be cheeses, breads, meats, vegetables, sauces, cook level, spicy level, etc.

There would also be store level tables that would be customizable but linked back to the core tables. This would allow stores to define their own name or prices for things, while still linking back to the centralized system. One table will be referenced by several other tables. For example, but not limited to, an Item will be linked to a category, genre, or industry. Thus allowing the system to create predefined menus or product listings based on specific things like genre or category.

Examples of User tables would be but not limited to; Accounts, addresses, payment methods, preferences, allergies, location history, favorite foods, favorite stores, linked accounts, order history including but not limited to tables relevant to the items and item options etc.

For example, In the system, the admin's of the system can specify a new

Search Functionality

The systems search engine is not like typical search engines. Results are so tightly connected to a user's search intentions because of the unique configuration of the information architecture within the database. To illustrate this point, conduct a test on any search engine. Type Hot Dog into the search engine and press enter. How many actually hotdogs will be listed vs. how many different types of pages with the words Hot and Dog will be there. When a user searches for a specially named item the results returned are all items like that item not like the name. If a user searches for a chicken sandwich the system will return all chicken sandwiches no matter what the store calls it. If the store names it "Terry's Superfly #1" but tagged it a chicken sandwich , the dish will be shown in the search engine, prioritized by location, so this really streamlines the item selection process for consumers. What is even better for the business is that, they can keep their naming convention and not have to worry about getting buried beneath other plainly named items.

Hierarchical Approval/Ordering

The present system will further include an embodiment of directing or controlling access to a payment method (e.g., a credit card). In one embodiment, the system will include hierarchical levels with various usage or access functionalities tied to a user's status within the hierarchical level. For example, a parent will link his card with his child's, or a company will share a card with an employee. Currently, a user wishing to share an account will call up a bank to ask the bank to issue a new credit card in another user's name. The system will include a payment system that permits restrictions to be set between users. For example, users will set restrictions on their own card, or for sub-accounts. As previously discussed, the present system will include a platform that hosts any variety of products and services, each of which will be predefined and cross-referenced. For example, a restaurant will fall under the industry of, "restaurant." In one embodiment, a restriction in the payment system will include limiting a card to usage in restaurants (or vendors associated with the system/platform that are identified as restaurants). In other words, the card will be used, provided a user purchasing through the system through a restaurant that also uses the system. One such scenario will include a parent user setting restrictions for a child user. For example, the parent will set pre-approval requirements, willbe on all orders, or only orders over a particular value, or anything but food. If the parent wants the child to only use the card for food, the system will provide restrictions that will include purchases of products not constituting food (e.g., alcoholic beverages). The system will further provide restrictions involving spending limits or timed spending limits (e.g., a certain dollar value per order, day, week, month, etc.)

In one embodiment, the system will provide the option to view transactions conducted through the system. For example, the parent will wish to monitor or control how the card is used. The system will provide options for viewing the transactions (e.g., daily, weekly, per order, etc.). In one embodiment, the option to view transactions will be tied to a user identity or hierarchy level within the system. For example, the parent user will view the transactions, while the child user will not have access to viewing certain transactions. In one exemplary case, the system will provide use of an account (e.g., from the credit card), without providing other access to the card. For example, the system will restrict viewing of actual card information (e.g., credit card number, access code, and/or expiration date), such that the card will not be used to items outside of the system. In this way, the users of the card will not have to worry about spending above a certain limit or losing a physical credit card. At the same time, the system will provide control to the parent user, or the user on a different hierarchical level.

Similarly for an organization, organizations will have policies governing their purchasing process. For example, approval for making a purchase will involve approval from a tech lead, a tech manager, and a director. In one exemplary scenario, the current system will provide preapproval to be at any level of the organization, and/or add additional users per approval from existing members.

Exemplary Case 1: The CEO can have a card. He will link the card to a director's account using the present system, wherein the card will be sub-assigned but will request pre-approval for payments exceeding $500. The director will access the card, whereupon he will assign the card to a manager, with the restriction that the card will request pre-approval for payments exceeding $250. In this exemplary case, the manager will further grant a technical lead access to the card.

Purchase 1 for $100: Based on all rules, the tech lead will make the purchase of $100 without approval from higher-ups, since the value has already been preapproved.

Purchase 2 for $300: The system will request approval from the director for the tech lead to make the purchase for $300, but the system will not prompt approval from the director, since the payment in this scenario will not incur the approval request for a payment exceeding $500.

Purchase 3 for $600: According to the restrictions set between the CEO, director, and manager, the system will request approval from the director for the tech lead to make the $600 purchase. After the director's approval is received, the system will further prompt the CEO to approve the purchase.

In another embodiment, the present system will provide the ability to label a payment option (e.g., by function or industry). For example, the system will recognize or identify a credit card labeled or marked as, "Food Purchases." Then, a user will use the credit card for any food purchases. In addition, the credit card will include a usage restriction, where usage of the credit card for non-food purchases will prompt a request for approval or a notification being sent.

In another example, a single payment option will include multiple labels, for example, "Food Purchases," "Retail Purchases," etc. The present system will provide separate reports based on industry type or types of purchases where the payment option was used. In one case, a payment option will be linked to or permitted to replace another payment option. For instance, credit card A will be linked to credit card B, or permitted to replace credit card B. Linked or interchangeable cards will have the same labels within the present system, so tracking of each division/group/sub-users on purchases can be observed. In one scenario, the labels will be reassigned or revised at any point. Furthermore, the system will provide different options for various tiers of users, so that different users have different options to revise the labels. For example, the system will provide a parent user with unlimited capability to label or revise labels, while providing a child user with limited capability to edit labels.

Automated Ordering System/VoIP Phone system

The system will permit deployment of phone and text phone automation ordering systems. For example, a vendor will enable either phone or text features (e.g., by clicking a button, triggering a timer, or by the user engaging a feature). The system will setup a new phone number that they can forward their calls to, which will answer, and speak to the customers via text to speech allowing them to, perform any of but not limited to, placing an order, checking the status of an order, routing calls to an employee directory (which will include features, e.g., forwarding to another number, ringing an employee through the system, and/or or leaving a voicemail), accessing a department queuing system (e.g., with the ability to link employees to departments and/or leave a voicemail at the department level), and speaking to a customer service agent/person from that store. The system will also provide a user interface for vendors and/or customers to answer/view the phone queue. In one embodiment, the system will link the vendor's phone number to the customer, e.g., when an order is placed, meaning the system will retrieve the customer's account and order history. Accessing the customer's account will reduce the time and error in requesting the customer's phone number, address, billing information for every call. In one case, the system will request a confirmation or PIN for account verification, so that a customer account/history will be updated or supplemented with new information, if appropriate.

The system will also provide such a capability for text messaging. For example, a user will text their number, and the system will provide prompts with options to navigate their menu via text, and check order status as well. The system will further provide the user with options to re-order anything in their account, check order status, or speak to a customer help representative. In one embodiment, the text messaging will also include pictures. For example, the system will include image recognition for features in an image, permitting a user to order an object by texting a picture of the object to an associated vendor.

All or any combination of the features and capabilities described above for the automated ordering system/VoIP system will be automatically available or provided to a vendor upon setup with the system. In other words, the system will provide a default automated ordering system/ VoIP system to vendors upon setup. In some embodiments, the provided default system will be predetermined and consistent for any vendor associated with the system. In other embodiments, the system will provide vendors with the capability to revise, select, customize, and/or enable/ disable certain features that are included in the default system. Furthermore, the system will be configured such that any of the features or capabilities will be enabled/disabled based on various conditions (e.g., based on time, call volume, user location, etc.). For example, enabling/disabling an ordering system based on time will involve the system recognizing store hours and disabling ordering or triggering the playing of a voicemail during a timeframe when the store is closed. An exemplary ordering system with a call volume trigger will include a user interface prompt suggesting a user to place an order via text or providing a link to an ordering menu if call volume is detected to exceed or be below a predetermined threshold volume.

The architecture of the present system, in one embodiment, will provide the ability to enable such ordering. For example, the present system will include a general template system used for all stores/vendors operating within the system. The template system will create a uniform flow and operation to the vendors' operation through the system, which will permit a routable call system that can be prompted with a function on an interface.

Data Analytics/Reports.

The unified design of the platform will provide the following capabilities:

From the Consumer Side

As previously discussed, the system will include purchase history of user accounts and sub-accounts. The system will provide user interfaces with the options for review and filter the history. For example, the system will provide both consumers and vendors with predictive/trending analyses. For instance, the system will detect patterns, e.g., the consumer buys 120 reams of paper every month. The system will provide a notification, e.g., "Company X offers a discount on orders over 100 reams" or "Would you like to set up reoccurring purchases to automatically buy paper at the beginning of every month?"

In the parent/child embodiment, a parent can observe the child's spending history. In doing so, the parent will alter the budget or set certain restrictions on the child's spending, e.g., by industry or location.

From the Business/Vendor side

The system will offer data to vendors, including: predictions on frequency of purchases (e.g., based on a user's previous purchasing or general purchasing habits), trending items in a given industry/region, predictions or reports on which products/services are most popular, profit margins for various products/services, price points or suggested price points for products/services, location/demographic information on customer bases, social media/marketing effective for the vendor and its respective customer made, searches made in the system relevant to the vendor, etc. The system will provide vendors with options to generate any variety of reports including any of the exemplary data types discussed.

System Features

The present system will include one or more of the following features:

Place Orders

Each user within the system will maintain a user profile, which will store their favorites (e.g., items, orders, and/or stores that the user frequently transacts with). The profile will further include a history of orders and searches. In one embodiment, users will place orders by selecting any item on the menu of a store or from their favorites. Menus will include pictures and/or descriptions. In one embodiment, the system will provide user interfaces and/or graphical tools that permit the profiles to be modified easily, e.g., using the store's management console or by the site administrators. In one embodiment, the menus will further include specified items with "Options," e.g., adding ketchup or other things to put on a hamburger, or the ability to select sides with an entree. The menus will include costs associated with each of the options, as well as a counter tabulating total transactional amounts in a transaction. In one embodiment, the system will include a management console providing the ability to set items to include options. The system will also include a notes section that will allow a user to be able to specify any request that is not pre-programed that will be seen in the kitchen of a participating vendor in the system. The system will further provide the request to be include in the customer's receipt and/or purchasing history.

Features of the system will include:

A user will access the system (e.g., via a mobile app or website). The user will select a vendor (e.g., a store). In one embodiment, the system will provide the vendor listing (e.g., from favorites in the user history or from the user's location). The system will display a menu (e.g., a menu will include multiple filter(s) to narrow down selections, pictures of selections, custom descriptions for the selections, etc.). The system will prompt and/or receive a selection from the user. The system will further provide a user interface with one or more of the following features:

View Menu, including options, e.g., Search, Filter, Price Range

View Details

View Popularity/Rating for item

View Profile Ordering History

View Favorites

View Trending Items

View Suggested Items—the system will suggest items to a user, based on data collection about the user, his/her environment, or any other focal point. Suggested items will include items comparable to the user's purchase or purchase history, items for upselling, popular items similar to the user's purchase (based on purchases of other users or similar users), etc.

View Relevant Items—The system will include items that will be suggested based on their relationship to a current user purchase. For example, the system will offer fries to a user purchasing a burger.

In one embodiment, the system will receive a user-selected item to their "Shopping Cart" (aka "Order," aka "Table"). In one embodiment, the system will provide a feature or user interface feature that will direct the user to a menu to continue "ordering" (shopping) or to check out. This process can be a loop (allowing for an undefined quantity of items added at a time).

Shopping Cart—The system will include a Shopping Cart function allowing users to modify quantities, add special notes to the order, calculate charges and fees, submit payment and enter coupons (or codes), etc.

Add to Order—The system will include a feature that will add an item to the shopping cart.

Review Order—The Shopping Cart feature will provide the option for a user to review an order before purchasing (e.g., inputting any promotions or pricing that will apply to the purchase, in association with the user or the user's purchase history).

Purchase feature—The purchase feature will include a prompt for a PIN or some form of confirmation prior to submitting the order.

Order Scheduling—Orders can be scheduled, for a future time as well as using a formula defined in a management console, initial values can be set, and will dynamically change as more users purchase that item. For example, a restaurant can set a minimum time frame before scheduling an order.

An exemplary scenario will include an order placed in the morning for delivery/pickup later in the day. Such an order will generate or initiate a "Placed Order Queue" in the system. The system will include formula values that will provide calculations for "prep time" for each item on the menu. Such a calculation will permit the user to place an order in advance and receive food prepared fresh, taking into account the delivery/pickup time. In one embodiment, the system will include a Management Console for vendors that will provide a section to define cook times.

The system will provide an "Order in Advance" feature that will calculate the "correct" time to process order, e.g., by utilizing restaurant system POS. "Order in Advance" will maintain an "audit" log for each order (including information, e.g., when an order was placed, payment status, and when an order has been passed-through the restaurants POS).

The system will also provide the option for a user to schedule reoccurring orders.

Rating Order System

Users will have the ability to rate their service and the item, order, and store. The feedback will be presented in the Management Console. In one embodiment, the rating will be scheduled to run instantly, daily, weekly, monthly ,or at a defined interval. Alternately or in addition, the rating system will be run ad-hoc. User profiles will provide the capability to review and update their "Rating/Submissions." Ratings will include a rate on a scale from 1-5 using stars, a color code, a description, etc. Service, item/product, overall experience, etc. will be subject to user ratings.

POS Integration

The system will include the ability to integrate with Point of Sale (POS) systems. The system will also include the ability to add in a new POS into the system. Each POS will include a custom schema file loaded in mapping out that POS database to the system of the current invention. The system will permit users and/or vendors to import data to this system, or directly inject into their own POS. Various devices, programs, or systems will include native apps that will perform such an injection. Alternatively, POSs will include APIs that can be utilized. Another method will include creating custom macros for each POS, which will be run on a local machine to receive an order from the system and place the order into the POS. The method will include emulating keyboard and mouse actions as though a user was manually entering the order and order details into a POS directly.

In one embodiment, orders will be processed and emailed to a restaurant vendor and/or automatically transmitted (e.g., printed) at the vendor.

In one embodiment, the system will include the ability to fully integrate pass-through order transactions to the predefined restaurant's POS system. Various order transactions will be added with the addition of more connectors. In one embodiment, the system will create a notification for each step in an ordering process, (1) Confirmation of Order Submission (2) Confirm Receipt of Payment (3) Confirm Order is ready for delivery/pickup, etc.

Payments

In one embodiment, payment will be processed electronically. Users will pay using a credit card, gift card, Apple Pay™, Google Wallet™, and/or PayPal® account. In one embodiment, the system will interact with cash, e.g., when orders are placed in-store. For example, an order placed via a wait staff's console will constitute an interaction through the system involving cash.

In-App Payments

In one embodiment, User profiles will include multiple credit cards or electronic payment systems/accounts. Transactions will be processed by the system, which will deduct two charges when showing how much is owed to a vendor (e.g., a processing fee and a service fee). In one embodiment, the user/customer will not see the service fee, which will refer to the system's charge for the service.

Built-in Marketing System

Features for vendors will reside in a management console included in the system.

In one embodiment, vendors will push "Proximity Promotions" based on GPS coordinates of users in proximity their store. For example, stores can push promotions to users logged-in to a related store app or users using the main system, and advertise to users that are 5 or 10 miles away from a brick-and-mortar location of the store, in one embodiment, the promotions will include any message, including discounts etc. The management console of the system will create custom promotions on the fly. These promotions will be opt in/out. For example, users can opt out, from any store, or altogether from these promotions. Promotions will have a fee charged based on amount of people receiving it.

In one embodiment, the system will use a user's mobile device GPS location (which can be turned off inside the settings feature of the app both from the end-user's app and the management console).

The GPS location will be updated in the database on a scheduled basis, and/or when the user opens the app. The system's management console will query (before and after a promotion is distributed) how many users are in "proximity" of the restaurant. The proximity field will be a variable that can be set by a manager of the management console.

Custom messages will be sent to targeted users based on location, frequency of purchases (e.g., using user histories to calculate target audience), frequency of any data stored in users' profile (provide a dropdown option to select a field to query within the database that only accesses user (customer) information without providing secure or confidential information), etc. In one embodiment, a purchase mechanism in the system will permit restaurants to pay for said marketing from the management console.

Businesses that use the system will be able to perform a lookup or query of sorts to determine their past customers and potential future customers and create an ad hoc group for the purposes of identifying a specific set of users from the overarching user community. This ad hoc group will be a permanent or temporary group of users or identifiable set of objects within the system. Businesses can create these ad hoc groups on the fly as needed to get real time updates for the group set/s. Custom promotions can be created and/or changed and pushed to the members of the ad hoc group, in any form of electronic communication and voice calls and even in in person transactions.

Push Notifications

In one embodiment, users will be notified of order statuses/promotions and or any other communication determined necessary by the Store, or Site Admin's. The messages will be texted, emailed, called, or provided via some other means of notifying the user.

In one embodiment, custom messages will be sent to targeted users based on location, frequency of purchases (e.g., using user histories to calculate target audience), frequency of any data stored in users' profile (provide a dropdown option to select a field to query within the database that only accesses user (customer) information without providing secure or confidential information), etc.

Loyalty Program

In one embodiment, the system will allow store manager/owners to create custom rewards (thresholds and incentives) for users based on purchase history.

Such a program will reward customers of the vendor for purchasing from them frequently. Simultaneously, loyalty programs will increase a store's ability to track orders, and generate statistics on all the orders, for example. From loyalty information, the system will provide vendors with information including, how often customers return, average order size, types of items people like, etc.

Custom Thresholds

In one embodiment, the system will include a loyalty system where the admin can select any field within the store's tables in the database and create a custom threshold for meeting the loyalty requirements. For example:

1 point for every dollar spent.

10 points on every order.

100 points on item X.

Customer Incentives

In one embodiment, the system will include (e.g., in the management console) a loyalty system where an admin can select any field within the store's tables in the database and create a custom incentive for meeting the loyalty threshold. For example:

Free Drinks when placing 5 orders.

100 points=1 dollar.

Coupons

In one embodiment, the system will allow a store or the app to create a coupon and specify an amount off (dollars or % or "freebies") duration until the promotion expires (with ability to select never). Other coupon/promotions settings will include: one time use (per user) only, maximum usage (based on all users), or promotions or coupons that vest by referring people, etc.

Store Branding/Settings

In one embodiment, the system will provide vendors with ways to customize their display interface. The customization will include features for customizing a menu (including price) and settings to reflect brand colors, pictures, logos, and icons. In one embodiment, pictures, icons, and colors throughout the app will be referenced by a variable pointing to a specific location. The system will provide (e.g., by way of the management console), a tool or selection for a vendor to upload new pictures (that can be used to update any menu item or to create a new menu item), and/or change the end-user application's colors and/or color scheme.

The management console will include a set color scheme, to provide visual distinction between the end-user's app and the Management console. Such a visual indicator will be used for one or both of the global app and the customized singular restaurant app. In one embodiment, the system will provide vendors with the ability to fully manage their own online store, adding custom pages (e.g., Contact Us), or other pages, for instance, using a what you see is what you get (WYSIWYG) online editing system. In this way, the system will replace vendors' needs for their own software or paying for their own for hosting.

In one embodiment, the system is configured in such a way that it allows businesses to keep their brand while providing bigger business resources. In the case of many major online reseller platforms, businesses that sell products are so tightly dependent on the platform they are selling their product on that they can't conduct their businesses without being controlled by the platform, how they want to market and charge them for. This system provides similar resources as the major online reseller platforms but doesn't take the businesses' identity in the process. The system allows businesses to customized their profile/pages to include company colors, logos and can be accessed by system users requiring users to navigate to a specific business' website. Additionally, the system can even make a store's profile serve as their primary website. This allows a business to promote their store and allow more items be purchased by users. Many online reseller platforms promote items not stores, after a user finds an item on the system, they are brought to the stores page to find other items that comes from that store, and promotes upselling.

Suggestion Box

In one embodiment, the system will provide users with the ability to leave suggestions that will be accessed by vendors. Such feedback will be anonymous or tracked by a user. Such an interface will permit users to interact with vendors directly, and vice versa. The system will further provide the functionality for vendors to reply publicly or privately to user feedback.

Group Order

In one embodiment, the system will provide the ability to "Group Order," e.g., by engaging a feature on an interface. The feature will generate a one-time use "group code" that can be used until the order has been placed or a timeout. This code can be sent via text, email, or verbally given to a user. In one embodiment, the system will also provide a user with a direct link to open the order, so that a user will send the order easily via an email or text. In one embodiment, the system will enable a group order without requesting users to enter a code. In doing so, the system will permit multiple users to place orders and link to one group order, since some vendors will instill a minimum ordering total (e.g., as a prerequisite for delivery). The system will also permit a group order owner to pay for sub-orders, pay partially for an order, or for one or more users in the group order to pay separately.

Purchase for someone else

In one embodiment, the system will provide users with the option to purchase or gift (e.g., meals) to any other user.

Subset of Coupons

In one embodiment, the system will provide the option to gift a purchase to another user by modifying the "Delivery Location," or in cases of pickup, provide an "Ordered under Name" option. In one embodiment, the system will provide the ability to buy (or give) gift cards to send to the gift to other members.

Nutritional Search

In one embodiment, the system will provide an interface sorting or arranging a menu based on nutritional values (i.e. based on diet or health restrictions). In one embodiment, the system will also prompt vendors to upload nutritional values for their dishes.

In one embodiment, the system will further include a "Create a Recipe Management Database" function, where a relationship between the Nutritional Database and the Recipe Management Database will be built, so that ingredients inputted in recipes use the ingredient in the Nutritional Database. The system will further create a query of each recipe returning values from the Nutritional Database, hence showing the nutritional value for each item on the menu. In one embodiment, the system will store the nutritional facts and ingredients for allergy-related users.

By having ingredients of recipes, users can define things they are allergic to, and the system will filter menu selections so that the user will not accidentally select an option that will induce an allergic reaction.

The nutritional database component really is part of a larger piece of the inventory management system. However, it is the core of the nutritional search functionality, recipe management and recipe creation, it can be used to stay away from allergies that aren't often communicated between a waiter and consumer. By incorporating the nutritional database system ingredients that make up an item are systematically matched to the corresponding object in the nutritional database.

This means you can set search criteria based on a particular diet and allergy. This means you can search for the healthiest, cheapest, closest to you, burger that offers delivery.

Inventory Management Tool

In one embodiment, the system will include an Inventory Management tool, for example, a tool including nutritional information, recipes, inventory of ingredients, inventory of wares (e.g., plates, glasses, pots, pans, etc.), other items/parts needed by that store, staff databases, etc. In one embodiment, such a tool will be integrated with the Recipe Management Database to permit vendors to track supplies of ingredients, calculate costs of each item on the menu, monitor popular items, etc. The inventory management tool will further include features, for example, ability to track the time associated with various menu items (e.g., time put into preparation), evaluate staffing per shift, comparing pricing with that of similar vendors, workflow/production flow analysis, etc.

Integrated Menu Boards

Since the system is a web based platform, as such all data is stored in the system online and can be accessed via internet accessible electronic devices. Electronic devices connected to the internet, such as smart TVs or any computer connected to a display, or any display with an embedded computer can access the system and a business can configure or an automated configuration can occur by means of predefined or ad hoc defined parameters to present a businesses product catalog/offerings or in the example of restaurants menu's can be displayed, the advantage for this is that when the business store profile updates its offerings within the system, the displays reflect the latest changes without requiring any user interaction. Additionally, these displays can be used for advertising other businesses, goods and/or services.

Single Login/Account

The system will provide users with the ability to login in to the system using the user profile, whereupon the user will have access to all the vendors (or vendors within a geographic radius of the user). Such an interface will provide a unified experience for the end-user. In one embodiment, such a login account that operates or allows access to any vendor operating using the system, will provide users with ease of access, whether the system or vendor operates via a global app or custom app, for example.

Self Service Kiosks

In the age on information and the age of automation, consumers are more comfortable engaging with non-human elements to accomplish same or similar tasks, such as taking an order. This is underscored by the concept of Ecommerce, traditionally speaking business was always in person up until the end of the 21st century. Users are purchasing more things online without talking to a human at all. Machines are here and they are not going away because they are cheaper than people. order Hopper system enables customers to be able to place orders by walking into a business and use a computer device of sort to search through the perspective business and place an order, pay and receive confirmation of sale without interacting with business employees, the employee that used to interface with customers all day are now available to help in other ways. The system kiosk is unique because the kiosk is essentially the system's web application in a box that a user can use at a store, just the view is locked down to the business that uses the kiosk. However what separates this kiosk from other kiosks is that; user identity is stored in a centralized system so new customers aren't unknown quantities for businesses but are fresh opportunities to make a lasting impression. Businesses can have all of the global preferences of a new user and can accommodate the use to their presence, whether allergy, nutritional, historical (what have I tried or not tried) or likes and dislikes, users have access to see what is trending in the world, country, city or even store.

Reservation/Appointment System

The system will provide a reservation/appointment/on-hold system. Such a feature will integrate with POS that will allow for orders to update delivery time, based on internal orders placed within the system. In one embodiment, the system will further show expected wait time (e.g., for a restaurant reservation), current time frame for schedule an appointment, etc.

Business's can manage their reservation booking system via the system, which mean kiosks can be used to allow customers to reserve a table while they go wait at the bar. (Where they can order and pay for drinks at the bar while they wait for their table to be ready.) Additionally, the ordering kiosk can be used to pickup orders by scanning a bar code or logging into the system. Kiosks will contain a storage container or sorts to provide either a vending machine experience or environmental controlled storage containers for proper transfer of goods.

Virtual Storefront

In one embodiment, the system will include a Virtual Marketplace granting a vendor a "store front." Such a storefront interface will include, for example, item description, current quantity available, pictures (e.g., custom and/or imported pictures), price, etc. in an ad-hoc capacity. The storefront will mimic the concept of ready-made foods, where customers can "buy it now" pick up the product in person. Exemplary storefronts will include bakeries, delis, cafes, or any retail/ wholesale shop.

Virtual Marketplace

Our marketplace enables businesses to interact with consumers/customers (e.g. marketing, feedback, status updates), businesses services to businesses (e.g. delivery, marketing, packaging etc...), vendors to businesses (e.g. suppliers to businesses), businesses to vendors (e.g. businesses to suppliers), business to customer services (e.g. dry cleaning, baby sitting, gardening etc . . . ). The system will provide an ecosystem for businesses to interact with customers and/or businesses to businesses and/or Automated Geographical Indexer/Mapping Feature In one embodiment, The platform will include a feature allowing stores to locate a person or item, within their store using data points. One possible method of collection of such data points would be, but not limited to, a user accessing the platform from their own device, which in turn will upload the GPS location of that user to the platform.

Another way or collecting such data points will include RFID. For example, items, people, or things, can be linked to an RFID chip, and sensors will be placed around a store to be able to triangulate or locate by other means said object.

Yet another way of collecting such data points will include prompting a user to scan an image or QR code, which will cause the system to provide a prompt on a user device including a link to the user's location. Each image will depict a unique location within a vendor's store, allowing a vendor to know where a consumer is located within the store, and when they arrived.

In one exemplary case, such an indexing/mapping feature will permit a consumer to place order simply be taking a picture of the image on the table. This will in turn open the consumer's interface and allow them to start ordering and link them to that table. The platform will notify vendors (or waiters) that someone has sat down and exactly what they ordered.

In another exemplary case, one or more consumers will walk into a bar and place an order for a drink using the platform, and the platform will provide a bartenders' interface indicating the consumer location. After the order is placed and paid for, the platform will provide an alert on a bartenders' interface and/or wearable device with the physical location to serve the order.

This auto mapping feature can be configured/calibrated as a static or dynamic topology, meaning each will auto map their Locations (e.g., table configuration, kitchen, or inventory control) as a defined layout and can auto adjust as the layout or configuration changes.

Cross Relational Functionality

The platform will correlate products/items/things throughout the system: both store-to-store and to a centralized aggregation of things. These correlations will be based on names, components, or any other attribute of aforementioned things.

These correlations will be used to facilitate search/navigation features. For instance, a difference between a 'name-based' search and the feature described will be: in a name-based search, a search query with the word, "Burger," will return only burgers and a search query with the word, "meat," will return only items with the word "meat" in the title. In the described system, a search for the word, "meat," will return both burgers and items with "meat" in the title, along with any other items that have been 'related' to "meat".

Another application of these correlations is in the realm of analytics/reports. The system will use these relationships to produce said reports.

Another usage of these relationships will be the aforementioned restriction-feature in which certain users/cards/etc. are unable to purchase certain items. The described relationships will allow for fine-grained restrictions.

Other embodiments and features of the described system and platform will be apparent to those skilled in the art from consideration of the specification and practice of the invention disclosed herein. It is intended that the specification and examples be considered as exemplary.

Global Customer Preferences

Traditionally every time a user finds a new store to make a purchase from the user has to add special instructions where necessary because new stores don't have the relationship with the customer to be able to anticipate the customer's preferences. This is possible because every item is tagged properly, not a manual process but an inherent result of the database schema. Each menu item is created from an object that is already defined, it is a semantic matching process that analyzes and item's properties and makes an accurate determination as to which global object it matches, then it tags the menu item with the global value.

Customer Cheat Sheet

This is one of the most profound features of the system. The customer cheat sheet breaks down all of the properties of a user to create a sense of familiarity for businesses to an existing customer and even more so to a new customer. This cheat sheet has a two-way benefit for businesses and consumers, businesses are able to understand what a customer's purchasing habits, order history, preferences on how the customer prefers an item to be prepared. While consumers are able to quickly place orders the specific way the want it prepared (because the configuration of an item type that they like is configured any new order in any store within the system is pre-populated with their custom preferences). Now waiters can promote items they know the customer will like and give the customer a sense that the store cares. The waiter will get recommendations for the user based on items they bought from other stores. And recommendations on upsell items. Or new items to suggest to the store because of similarities of other users purchases.

The system is so much more than an Ecommerce platform; it is an ecosystem. With all the different types of users there present additionally use applications such as business to business services, i.e. a delivery service that serves all stores within a region. Vendor to business, which allows vendors to sell their products directly to the store, linked to the inventory management system. Business Service to consumer, allow consumers to schedule for services like maid services, car cleaning, parking etc.

Vendor Market Place

Vendor to business services, vendors can now publish their offerings on the system and businesses can place orders and have extra capabilities than alternative systems. Businesses can now do a "Reverse Auction" whereby a business can request a product for a certain price and the vendor can then open the deal to other businesses to spread the cost through a high volume to afford the sale price. For example, if a Deli wants to run a sale on Ruben sandwiches the Deli could create a reverse auction for $3 per pound off the regular price and the meat supplier can open that deal to 100 other businesses to sell a higher volume of corned beef to make up for the lower price. Additionally, when used in conjunction with the inventory management component, businesses can either auto reorder or automate the reordering process and implement manual checks but gone will be the days of having to figure out how much supplies a manager needs to order.

Business to Business Services Layer

Businesses can provide services to other business within the confines of the system. Which if any business has dependencies such as shipping and receiving, consumers' orders can have accurate updates presented to them, minimizing bad customer experiences). For example, if a customer orders printed invitations, and the business selling the invitations outsources the printing of the invitations. If there is a delay from the business printing the invitations, the consumer's order for printed invitations will be automatically updated to reflect a change in status based on the supply chain. The invitations will get picked up by the delivery service company and then delivered to the consumer.

Business Service to Consumer

Businesses that offer services can target customers and allow them to schedule and purchase services. For example, a consumer can look for baby sitters, or lawn services, or pay for parking. Consumers can see ratings left by other users which will help in determine which baby sitter or other service to get.

Business to Consumer Goods Layer

Since all businesses using system are connected, a third entity can create a business selling either unsold goods at a discount or sell portions of a business's inventory and coordinate the delivery of said inventory. Because each business is geographically spread out (unlike big box stores), 5-10% of inventory can be reserved for a subscription or deliver service whereby a consumer purchases a subscription and the third party pays the business with the inventory a discounted rate and arranges for the delivery of the goods therefore able to make a small profit for facilitating the movement of goods from businesses to customers. Typically, if you want to provide goods to a large amount of consumers, one would need to get a large warehouse and stock the warehouse with inventory to be sold. In this scenario there is no need for a warehouse because one could use a shared resource approach by getting 5% from 100 business in order to achieve the 500% of inventory, thus saving overhead by not needing a large warehouse and employees to stock and manage it. Additionally, delivery becomes easier because the portions of the "distributed warehouse" are spread out so shipping isn't as far as it would be from a fixed location.

Workflow Streamline Generator

Once there are other types of businesses on the system, it will allow a business to create a streamlined workflow. An example might be if a retail business sells shirts and consumer orders a customized shirt, the system would automatically send the customized order to the manufacture the retails business uses for the shirts, then once the shirts are ready, the system will notify the delivery business where to pickup the order, the system will also notify the consumer at each step to update them on the current status.

Another example would before automated reorder of products based on inventory going low. The business will setup which businesses they get each product for and when to reorder more.

Another example would be for delivery guys; the system would alert the delivery guy to return to the business because there are more orders to pick up. This would actually allow for local delivery guys to work for several businesses as the same time, and the system would automatically streamline and make his route optimized.

Internet Gateway

Currently there is a widely use concept called payment gateways. This allows websites to allow consumers to use a credit card to order from their site. It takes the consumers credit card, and the amount for the transaction and sends it up to the payment gateway which handles verifying it's a real credit card, and moving the money/charging the card, so that the business ends up with the money in their account.

When the site makes the request, as mentioned they only send Credit card info and amount to charged not the actual items being purchased. As mentioned above there is a need for more granular control over who makes what purchases. This system would allow consumers to register their credit cards' within the item gateway, and set any rules/restrictions/thresholds/preapproval process as needed. Then any site that utilizes this item gateway, will submit the actual items being purchased, and the credit card info, allowing a line by line approval.

Items on user sites will require an id that is registered within the centralized item gateway. In one embodiment, this item id will be a UPC code that in already a standard, or a custom code used only by that store. All codes will be stored in the item gateway and tagged to allow for regulation and control, will or will not include and not limited to category, type, cost, genre, age, alcohol, food, etc.

The item gateway will have the ability to send a text, message, or notification to the consumer who registered the card, for approval. The transaction will be on hold until the request is approved or declined. This allows for an extra layer of security to allow for such things like multi factor authentication. The amount of time a transaction waits can be configured by the store and or the consumer of the card. The consumer will set auto approve after X minutes, or Auto deny after X minutes.

What is claimed:

1. An e-commerce system configured to efficiently facilitate and improve commerce both online and in stores, said ecommerce system comprising:

b. a Web based User Interface utilizing a centralized cross relational database having: configurable store templates, for registered stores, having product related information and business related information grouped by at least one category and at least one genre, including groupings of purchasable items or services configured to be referenced by the stores;

wherein said centralized cross relational database has a memory storing on at least one non- transitory computer readable medium having an input mechanism, an output mechanism, and a transmission configuration chosen from the group: internet, Short Message Service, Multimedia Messaging Service, wireless, connected to the Internet;

c. a store deployment system utilizing said configurable store templates, said store deployment system configured to allow said registered stores to sell said purchasable items by specifying said at least one category and said at least one genre of said registered store such that said configurable store templates automatically correlate information stored within said configurable store templates;

d. a configuration modification system configured to add, modify, and track employee information and said purchasable items or services of said registered stores, said configuration modification system linked to said centralized cross relational database configured to provide analytics per said registered stores, said configuration modification system configured to be deployed from said configurable store templates, said configuration modification system having features, chosen from the group: title, description, price, images, options, keywords, disable/remove said purchasable items or services not sold by said registered store;

e. an analytics system configured to create, enable, modify, and run analytics generated by cross-referencing at least one related object stored within said centralized cross relational database chosen from the group: similar markets, regions, locations, products, services, items, pricing, industry, genre, user/customer/store base, user/customer/store information, user/customer/store order history, ad history, employee transaction, employee data, marketing history;

f. a customized report system configured to generate a customized report of a customer, said customized report containing data aggregation on said customer, a supplier and said registered store, said data aggregation chosen from the group: sales, comments, current location, location history, purchase history, stored preferences of purchasable items or services, configuration of items or services;

said customized report system configured to offer targeted products to said customer and to record behavior, tipping patterns, likes, dislikes from said customer;

said customized report system configured to automatically alert employees based on triggers chosen from the group: high-value customer, highly motivated customer, dangerous customer, geolocation of a customer personal device;

g. an ad and marketing campaign configured to automate sending ads and marketing campaigns to said customer of said registered store, based on at least one factor chosen from the group: customer preferences, order history, friends, location data, item or service preferences, generalized location data, historical location data, purchase history at other stores, targeted location data, current location based on said customer personal device;

h. a geo-location based ads and promotions system accessible to said registered store, configured to generate, provide and share geo-location based ads and promotions, enabling said registered store to send ads and promotions to said customer within a defined distance from a location of said registered store based on at least one chosen from the group: customer preferences, order history, friends, location data, item or service preferences, generalized location data, location history data, purchase history at said registered store; said geo-location based ads and promotions configured to be generated based on a time-based sale, to previous customers who are currently within a radius of said registered store, with a discount code; said geo-location based ads and promotions system being automated;

i. a customer ordering system configured to automate ordering of said purchasable items or services on behalf of said customer based on availability and a set interval of time; said customer ordering system having said server receiving an order for said purchasable items or services from said customer via said customer personal device, said customer personal device later sending, to said server, a dynamic location of said customer at the time to deliver said order based upon a combination of GPS, RFID tagged location, address, QR code linked to a location, and sensors triangulating the users location;

j. a multi-factor authentication secured system;

k. a rule creation system for said customer, said rule creation system configured to allow said customer to create additional rules to restrict and enable access to accounts, such as virtual cards, chosen from the group: control ordering, limit ordering, require approval if the quantity or an item or service is over a specified amount, require approval if the price of an item or service is over a specified amount; said rule creation system further comprising an item or service gateway configured to store product codes associated with specific items or services for sale by said registered store;

l. a digital display system configured to allow said registered store to configure a live digital menu, said live digital menu configured to display at least one chosen from the group: said purchasable items or services, services offered, previous order history of said customer, a profile of said customer;

m. a group ordering system configured to transmit information between said customer and other customers wherein said customer communicates with said other customers to arrange a group purchase order comprising a customized item or service; said group ordering system configured such that said customer and said other customers determine a party responsible for paying for said group purchase order;

n. a payment processing feature; and o. a purchase history system configured to store the purchase history of a particular credit card such that a new account associated with said particular credit card maintains purchase history of an old account associated of a registered user.

* * * * *